(12) United States Patent
Spata et al.

(10) Patent No.: US 12,111,386 B2
(45) Date of Patent: Oct. 8, 2024

(54) METHODS AND SYSTEMS FOR PREDICTING A TRAJECTORY OF AN OBJECT

(71) Applicant: Aptiv Technologies AG, Schaffhausen (CH)

(72) Inventors: Dominic Spata, Witten (DE); Arne Grumpe, Essen (DE); Mirko Meuter, Erkrath (DE); Ido Freeman, Düsseldorf (DE)

(73) Assignee: Aptiv Technologies AG, Schaffhausen (CH)

(*) Notice: Subject to any disclaimer, the term of this patent is extended or adjusted under 35 U.S.C. 154(b) by 541 days.

(21) Appl. No.: 17/384,449

(22) Filed: Jul. 23, 2021

(65) Prior Publication Data

US 2022/0026556 A1 Jan. 27, 2022

(30) Foreign Application Priority Data

Jul. 24, 2020 (EP) .................................... 20187694
Jul. 16, 2021 (EP) .................................... 21186073

(51) Int. Cl.
*G01S 13/58* (2006.01)
*G01S 13/06* (2006.01)
*G06N 3/045* (2023.01)
*G06N 3/08* (2023.01)

(52) U.S. Cl.
CPC .............. *G01S 13/58* (2013.01); *G01S 13/06* (2013.01); *G06N 3/045* (2023.01); *G06N 3/08* (2013.01)

(58) Field of Classification Search
None
See application file for complete search history.

(56) References Cited

U.S. PATENT DOCUMENTS

| 10,672,389 B1 * | 6/2020 | Abeloe | G06N 3/088 |
|---|---|---|---|
| 2017/0147888 A1 | 5/2017 | Zeng | |
| 2017/0293837 A1 | 10/2017 | Cosatto et al. | |
| 2018/0053108 A1 * | 2/2018 | Olabiyi | G06N 3/044 |
| 2018/0089515 A1 | 3/2018 | Yang et al. | |

(Continued)

FOREIGN PATENT DOCUMENTS

| CN | 111401419 | 7/2020 |
|---|---|---|
| DE | 102016122190 | 5/2017 |

(Continued)

OTHER PUBLICATIONS

"Extended European Search Report", EP Application No. 21186073.9, Dec. 16, 2021, 17 pages.

(Continued)

Primary Examiner — Vladimir Magloire
Assistant Examiner — David C. Schultz
(74) Attorney, Agent, or Firm — Harness, Dickey & Pierce, P.L.C.

(57) ABSTRACT

A computer implemented method for predicting a trajectory of an object comprises the following steps carried out by computer hardware components: acquiring radar data of the object; determining first intermediate data based on the radar data based on a residual backbone using a recurrent component; determining second intermediate data based on the first intermediate data using a feature pyramid; and predicting the trajectory of the object based on the second intermediate data.

23 Claims, 8 Drawing Sheets

(56) References Cited

U.S. PATENT DOCUMENTS

| | | |
|---|---|---|
| 2018/0232585 A1 | 8/2018 | Kim |
| 2019/0026597 A1 | 1/2019 | Zeng et al. |
| 2019/0049987 A1 | 2/2019 | Djuric et al. |
| 2019/0065878 A1 | 2/2019 | Zeng et al. |
| 2019/0161080 A1 | 5/2019 | Gochev et al. |
| 2019/0179328 A1 | 6/2019 | Movert et al. |
| 2020/0019794 A1* | 1/2020 | Engelcke ............. G06N 3/08 |
| 2020/0026960 A1* | 1/2020 | Park ................. G05D 1/228 |
| 2020/0057141 A1* | 2/2020 | Kim ................. G01S 13/726 |
| 2020/0090516 A1* | 3/2020 | Sert ................. G08G 1/141 |
| 2020/0092463 A1* | 3/2020 | Wang ................. G06V 10/82 |
| 2020/0160559 A1* | 5/2020 | Urtasun ............. G06V 20/58 |
| 2020/0175695 A1* | 6/2020 | Zhang ............... G06V 10/764 |
| 2021/0107532 A1 | 4/2021 | Zhao et al. |
| 2021/0192347 A1 | 6/2021 | Zhao et al. |
| 2021/0271252 A1 | 9/2021 | Zhao et al. |

FOREIGN PATENT DOCUMENTS

| | | |
|---|---|---|
| DE | 102018117777 | 1/2019 |
| DE | 102018120405 | 2/2019 |
| DE | 102017121052 | 3/2019 |
| EP | 1779295 | 5/2007 |
| EP | 2765533 | 8/2014 |
| EP | 2784722 | 10/2014 |
| EP | 3438872 | 2/2019 |
| EP | 3839805 | 6/2021 |
| WO | 2016130719 | 8/2016 |
| WO | 2017177005 | 10/2017 |
| WO | 2018204656 | 11/2018 |

OTHER PUBLICATIONS

"Extended European Search Report", EP Application No. 19202631.8, Apr. 16, 2020, 12 pages.

"Extended European Search Report", EP Application No. 19219051.0, Jul. 23, 2020, 11 pages.

"Extended European Search Report", EP Application No. 20159899.2, Sep. 1, 2020, 11 pages.

"Extended European Search Report", EP Application No. 20187694.3, Dec. 3, 2020, 14 pages.

Alahi, et al., "SocialLSTM: Human Trajectory Prediction in Crowded Spaces", Jun. 2016, 11 pages.

Ba, "Blending Diverse Physical Priors with Neural Networks", Oct. 1, 2019, 15 pages.

Bahram, et al., "A Combined Model- and Learning-Based Framework for Interaction-Aware Maneuver Prediction", Abstract Only, Jan. 7, 2016, 2 pages.

Bansal, "ChauffeurNet: Learning to Drive by Imitating the Best and Synthesizing the Worst", Dec. 7, 2018, 20 pages.

Culurciello, "The fall of RNN / LSTM", Apr. 13, 2018, 10 pages.

Dequaire, et al., "Deep Tracking in the wild: End-to-end tracking using recurrent neural networks", Jun. 22, 2017, pp. 492-512.

Gupta, et al., "Social GAN: Socially Acceptable Trajectories with Generative Adversarial Networks", Mar. 29, 2018, 10 pages.

He, "Deep Residual Learning for Image Recognition", Dec. 10, 2015, 12 pages.

Kerfs, "Models for Pedestrian Trajectory Prediction and Navigation in Dynamic Environments", May 2017, 146 pages.

Lee, et al., "DESIRE: Distant Future Prediction in Dynamic Scenes with Interacting Agents", Apr. 14, 2017, 10 pages.

Lefevre, et al., "A Survey on motion prediction and risk assessment for intelligent vehicles", Jul. 2014, 20 pages.

Li, et al., "Fusion Modeling Method of Car-Following Characteristics", Nov. 2019, 8 pages.

Lin, et al., "Focal Loss for Dense Object Detection", Feb. 7, 2018, 10 pages.

Luo, et al., "Fast and Furious: Real Time End-to-End 3D Detection, Tracking and Motion Forecasting with a Single Convolutional Net", Jun. 2018, pp. 3569-3577.

Makansi, et al., "Overcoming Limitations of Mixture Density Networks: A Sampling and Fitting Framework for Multimodal Future Prediction", Jun. 8, 2020, 18 pages.

Min, et al., "RNN-Based Path Prediction of Obstacle Vehicles With Deep Ensemble", Jul. 23, 2020, 5 pages.

Musicki, et al., "Joint Integrated Probabilistic Data Association—JIPDA", Aug. 2004, pp. 1120-1125.

Park, et al., "Sequence-to-Sequence Prediction of Vehicle Trajectory via LSTM Encoder-Decoder Architecturef", Oct. 22, 2018, pp. 1672-1678.

Particke, et al., "Neural Network Aided Potential Field Approach for Pedestrian Prediction", 101/5/2019, 6 pages.

Sadeghian, et al., "SoPhie: An Attentive GAN for Predicting Paths Compliant to Social and Physical Constraints", Jun. 2018, pp. 1349-1358.

Wang, et al., "Robust and Fast Vehicle Turn-counts at Intersections via an Integrated Solution from Detection, Tracking and Trajectory Modeling", Jun. 14, 2020, 9 pages.

Xue, et al., "Pedestrian Tracking and Stereo Matching of Tracklets for Autonomous Vehicles", Apr. 28, 2019, 5 pages.

Zernetsch, et al., "Trajectory Prediction of Cyclists using a physical model and an artificial neural network", Jun. 2016, pp. 833-838.

Zhao, "Multi-Agent Tensor Fusion for Contextual Trajectory Prediction", Jul. 28, 2019, 9 pages.

\* cited by examiner

METHODS AND SYSTEMS FOR PREDICTING A TRAJECTORY OF AN OBJECT

CROSS-REFERENCE TO RELATED APPLICATIONS

This application claims priority to European Patent Application Number 21186073.9, filed Jul. 16, 2021, and European Patent Application Number 20187694.3, filed Jul. 24, 2020, the disclosures of each are hereby incorporated by reference in their entireties herein.

BACKGROUND

The present disclosure relates to methods and systems for predicting a trajectory of an object, for example for determining a plurality of parameters of a parametrization of a predicted trajectory of an object.

Object tracking is a feature, for example, in a partially or fully autonomous driving vehicle.

Conventional methods for multi-object tracking on radar data perform clustering to combine individual point detections into object proposals and then use recursive filtering with an appropriate motion model to yield object trajectories. The tracking problem is thus split into motion prediction and data association of detected object and existing object tracks. Due to the noisiness and sparseness of radar data, conventional methods often have issues distinguishing a target from background and correctly estimating its size and rotation, especially when the target is stationary.

Accordingly, there is a need to provide more reliable and efficient object tracking.

SUMMARY

The present disclosure provides a computer implemented method, a computer system, a vehicle and a non-transitory computer readable medium according to the independent claims. Embodiments are given in the subclaims, the description and the drawings.

In one aspect, the present disclosure is directed at a computer implemented method for predicting a trajectory of an object, the method comprising the following steps performed (in other words: carried out) by computer hardware components: acquiring radar data of the object; determining first intermediate data based on the radar data based on a residual backbone using a recurrent component; determining second intermediate data based on the first intermediate data using a feature pyramid; and predicting the trajectory of the object based on the second intermediate data. According to various embodiments, the radar data of the object comprises at least one of radar cube data or radar point data.

In other words, the method may provide a multi-object tracking approach for radar data that combines approaches into a recurrent convolutional one-stage feature pyramid network and performs detection and motion forecasting jointly on radar data, for example radar point cloud data or radar cube data, to solve the tracking task.

Radar cube data may also be referred to as radar data cubes.

According to various embodiments, a network may be provided, which uses radar data as input, propagates the data through multiple intermediate network layers, which partially relate information from different scans from different points in time with each other to generate intermediate data (for example using recurrent convolutional neuronal networks). The network may use a pyramidal structure to process said intermediate data and to generate new intermediate data and finally uses this intermediate data to detect objects and predict a trajectory for each object.

According to various embodiments, the input data may include or may be radar cube data, and network layers may be used to propagate and transform the input data to the desired output data domain.

According to various embodiments, the input data may include or may be radar point data as input representation of the radar data.

This may provide an efficient and reliable way of object detection and motion trajectory prediction.

According to another aspect, the computer implemented method further comprises the following steps carried out by the computer hardware components: determining third intermediate data based on the second intermediate data using a regression head; and predicting the trajectory of the object based on the third intermediate data.

According to another aspect, the computer implemented method further comprises the following steps carried out by the computer hardware components: determining fourth intermediate data based on the second intermediate data using a classification head; and predicting the trajectory of the object based on the fourth intermediate data.

It will be understood that the trajectory of the object may be predicted based on the third intermediate data and the fourth intermediate data.

The classification head may be used to obtain categorical information such as at which of the predetermined anchor positions actual objects currently reside and which classes these objects belong to (for example pedestrian, vehicle, etc.). The regression head may provide continuous information such as an object's precise location, size, and rotation over time and may therefore solely be responsible for performing motion forecasting. As such, the classification head may only be involved in the generation of the forecasts/tracklets in so far as it indicates which positions within the regression head's output map contain information belonging to an actual object.

According to another aspect, predicting the trajectory comprises determining a tracklet for a plurality of time steps. The tracklet may include a predicted trajectory only for a limited or small number of time steps (for example 3, or for example 5), which may then be used (starting from different time steps) to determine a longer trajectory.

According to another aspect, the residual backbone using the recurrent component comprises a residual backbone preceded by a recurrent layer stack.

According to another aspect, the residual backbone using the recurrent component comprises a recurrent residual backbone comprising a plurality of recurrent layers. It has been found that providing a plurality of recurrent layers in the backbone improves performance by allowing the network to fuse temporal information on multiple scales.

According to another aspect, the plurality of recurrent layers comprise a convolutional long short-term memory followed by a convolution followed by a normalisation.

According to another aspect, the plurality of recurrent layers comprise a convolution followed by a normalization followed by a rectified linear unit followed by a convolutional long short-term memory followed by a convolution followed by a normalisation.

According to another aspect, the recurrent component comprises a recurrent loop which is carried out once per time frame. It has been found that this may provide efficient processing.

According to another aspect, the recurrent component keeps hidden states between time frames. This may provide that the method (or the network used in the method) can learn to use information from arbitrarily distant points in time and that past sensor readings do not need to be buffered and stacked to operate the method or network.

According to another aspect, the feature pyramid comprises transposed strided convolutions. This may increase the richness of features.

According to another aspect, training of the method comprises dividing a training data set into a plurality of subsets and/or retaining hidden states between optimization steps. This may improve the ability of the method to model time-dependencies within the same memory constraints.

In one aspect, the present disclosure is directed at a computer implemented method for determining a plurality of parameters of a parametrization of a predicted trajectory of an object, the method comprising the following steps performed (in other words: carried out) by computer hardware components: acquiring radar data of the object; determining first intermediate data based on the radar data based on a residual backbone using a recurrent component; determining second intermediate data based on the first intermediate data using a feature pyramid; and determining the plurality of parameters based on the second intermediate data. According to various embodiments, the radar data of the object comprises at least one of radar data cubes or radar point data.

A trajectory may be understood as a property (for example location or orientation/direction) over time.

In other words, the method may provide a multi-object tracking approach for radar data. The method may combine approaches into a recurrent convolutional one-stage feature pyramid network and performs detection and motion forecasting jointly on radar data, for example radar point cloud data or radar data cubes, to solve the tracking task.

According to various embodiments, a neural/neuronal network may be provided, which uses radar data as input, propagates the data through multiple intermediate network layers, which partially relate information from temporally different scans with each other to generate intermediate data (for example using recurrent convolutional neuronal networks). The network may use a pyramidal structure to process said intermediate data and to generate new intermediate data and finally uses this intermediate data to detect objects and predict a trajectory for each object.

According to various embodiments, the input data may include or may be radar data cubes, and network layers may be used to propagate and transform the input data to the desired output data domain.

According to various embodiments, the input data may include or may be radar point data as input representation of the radar data.

This may provide an efficient and reliable way of object detection and motion trajectory prediction.

According to another aspect, the parametrization comprises a polynomial of a pre-determined degree; and the parameters comprise a plurality of coefficients related to elements of a basis of the polynomial space of polynomials of the pre-determined degree. The method may provide polynomial forecasting for DeepTracker.

According to another aspect, the elements of the basis comprise monomials. The monomials may include "1", "x", "$x^2$", ..., up to the pre-determined degree.

The polynomials may be functions of time (so x is a variable time value).]

According to another aspect, the parametrization comprises a first parametrization, parameterizing a position trajectory of the object, and a second parametrization, parameterizing an orientation of the object. It has been found that not only the position trajectory, but also the orientation trajectory may be parameterized.

The velocity may be estimated (for example via differentiation).

According to various embodiments, a network may be provided, which uses radar data as input, propagates the data through multiple intermediate network layers, which partially relate information from different scans from different points in time with each other to generate intermediate data (for example using recurrent convolutional neuronal networks). The network may use a pyramidal structure to process said intermediate data and to generate new intermediate data and finally uses this intermediate data to detect objects and predict a trajectory for each object.

According to various embodiments, the input data may include or may be radar data cubes, and network layers may be used to propagate and transform the input data to the desired output data domain.

According to various embodiments, the input data may include or may be radar point data as input representation of the radar data.

According to another aspect, the computer implemented method may further comprise the following steps carried out by the computer hardware components: determining third intermediate data based on the second intermediate data using a regression head; and determining the parameters based on the third intermediate data.

The regression head may provide continuous information such as an object's precise location, size, and rotation over time and may therefore solely be responsible for performing motion forecasting. As such, the classification head may only be involved in the generation of the forecasts/tracklets in so far as it indicates which positions within the regression head's output map contain information belonging to an actual object.

According to another aspect, the residual backbone using the recurrent component comprises a residual backbone preceded by a recurrent layer stack.

According to another aspect, the residual backbone using the recurrent component comprises a recurrent residual backbone comprising a plurality of recurrent layers. It has been found that providing a plurality of recurrent layers in the backbone improves performance by allowing the network to fuse temporal information on multiple scales.

According to another aspect, the plurality of recurrent layers comprise a convolutional long short-term memory followed by a convolution followed by a normalization.

According to another aspect, the plurality of recurrent layers comprise a convolution followed by a normalization followed by a rectified linear unit followed by a convolutional long short-term memory followed by a convolution followed by a normalization.

According to another aspect, the recurrent component comprises a recurrent loop which is carried out once per time frame. It has been found that this may provide efficient processing.

According to another aspect, the recurrent component keeps hidden states between time frames. This may provide that the method (or the network used in the method) can learn to use information from arbitrarily distant points in time and that past sensor readings do not need to be buffered and stacked to operate the method or network.

According to another aspect, the feature pyramid comprises transposed strided convolutions. This may increase the richness of features.

According to another aspect, training of the method comprises dividing a training data set into a plurality of subsets and/or retaining hidden states between optimization steps. This may improve the ability of the method to model time-dependencies within the same memory constraints.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising a least a subset of the computer system.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

The methods and devices according to various aspects or embodiments provide a deep multi-object tracker for radar.

The tracker is a one-stage recurrent convolutional neural network, which performs dense detection and motion forecasting on radar data, for example radar point cloud data or radar cube data. It may operate on a single frame of data at a time and may continuously update a memory of past information.

The motion forecast information the network predicts at each frame is combined to yield object trajectories.

The system melds and improves mainly three recent deep learning systems: RetinaNet (which is an anchor-based feature pyramid detection network), Fast&Furious (which is a forecasting-based tracking network), and DeepTracking (which is a recurrent occupancy forecasting network).

BRIEF DESCRIPTION OF THE DRAWINGS

Exemplary embodiments and functions of the present disclosure are described herein in conjunction with the following drawings, showing schematically.

DETAILED DESCRIPTION

According to various embodiments, deep learning methods, which include convolutional (artificial) neural networks, may be applied to detection and tracking problems using radar data. Various embodiments may use or enhance deep learning methods, for example RetinaNet, Fast&Furious tracker, and Deep Tracking.

The anchor-based one-stage detection network RetinaNet uses a convolutional feature pyramid for efficient multi-scale detection on top of a ResNet backbone and an extension of binary-cross entropy called "focal loss" that emphasizes hard examples through an intuitive weighing scheme. RetinaNet is designed for vision and does not perform tracking or exploit temporal cues, which is vital for radar data.

The Fast&Furious tracker is an anchor-based one-stage network designed for operating on LiDAR (light detection and ranging) data. Fast&Furious performs tracking by learning to produce a fixed-length motion forecast for all detected targets and then registering and combining the resulting tracklets (i.e. the tracks for only a small number of time steps) into full tracks. It exploits temporal information by performing 3D (three-dimensional) convolutions on a stacked representation of multiple frames of data. Time information is, therefore, limited to the five most recent frames. It furthermore lacks a feature pyramid, limiting the influence of scene context.

DeepTracking is a recurrent convolutional network that uses Gated Recurrent Units (GRUs) to complete and forward-predict occupancy and semantic maps from partial evidence provided by LiDAR scans. It does not, however, spatially or temporally coalesce information from these maps into object identities. Furthermore, it performs forward-prediction by continuing the recurrent loop without data, which requires the recurrent states to be reset and a history of the most recent frames to be fed into the network each time a forecast is to be created.

According to various embodiments, the aforementioned approaches may be melded into a recurrent convolutional one-stage feature pyramid network that performs detection and motion forecasting jointly on radar point cloud data to solve the tracking task. As described in more detail below, several improvements have been made to the network details to improve the system for use in the radar domain. With the strength of convolutional neural networks, classical methods may be outperformed significantly, especially on stationary targets, without requiring sophisticated filtering methods or explicit motion models.

Figure 1:
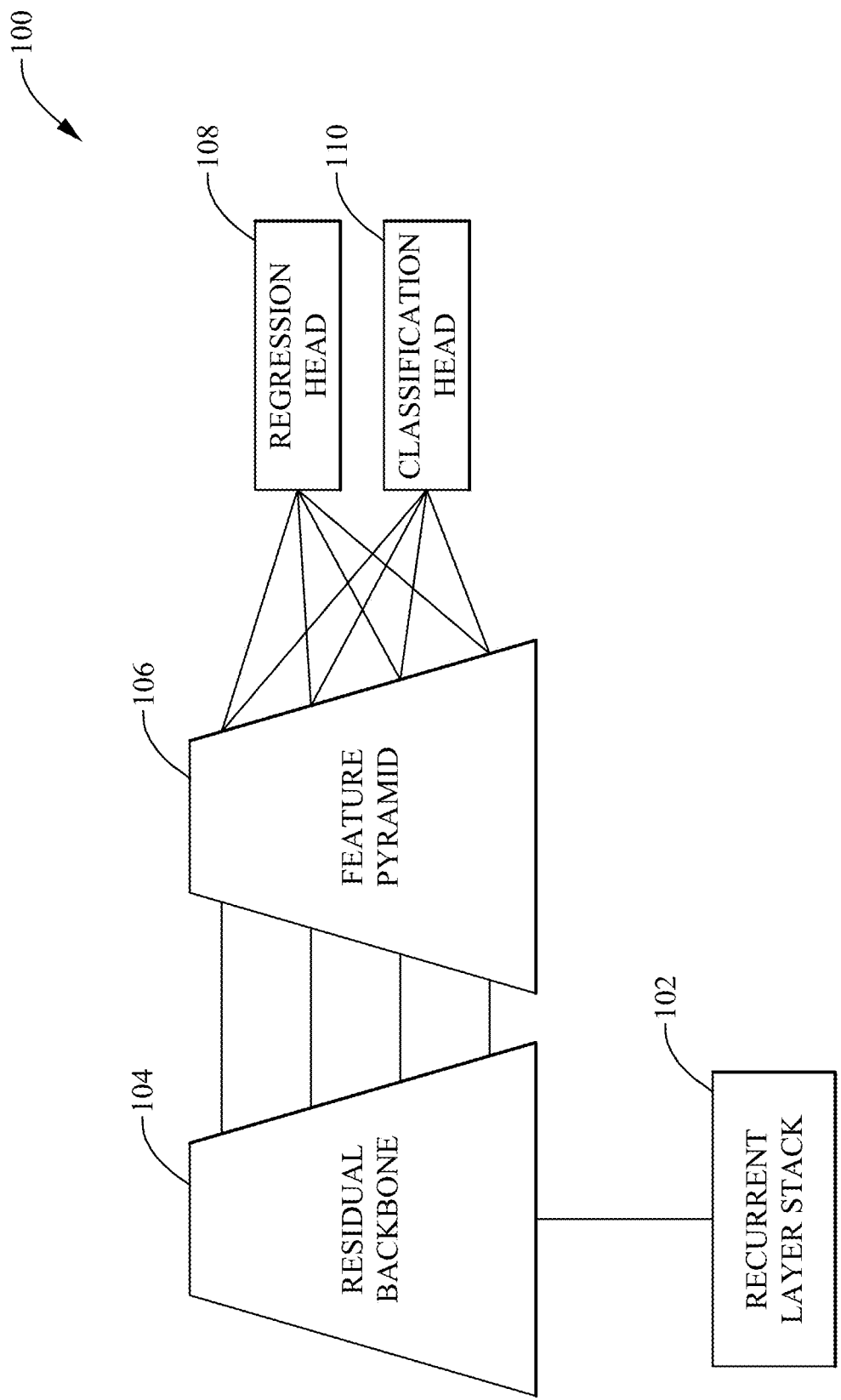
FIG. 1 an illustration of a network architecture according to various embodiments.
Figure 2:
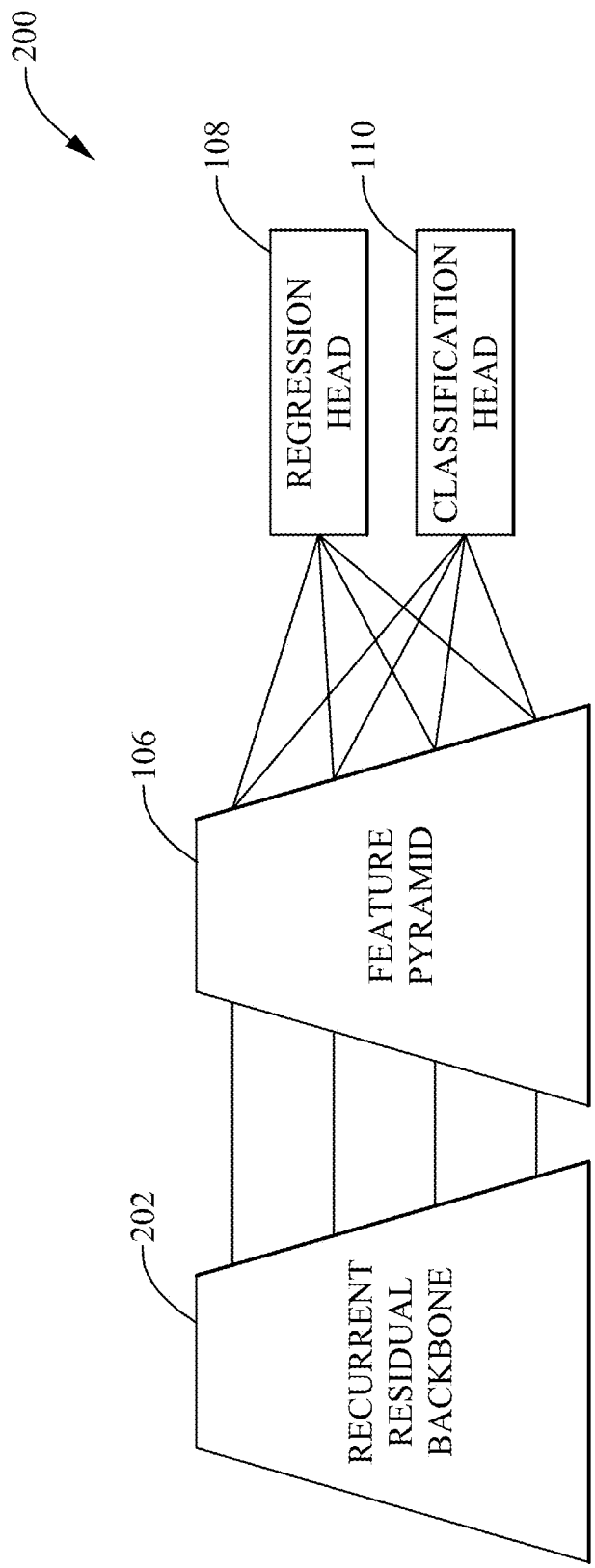
FIG. 2 an illustration of a network architecture according to various embodiments.
Figure 3:
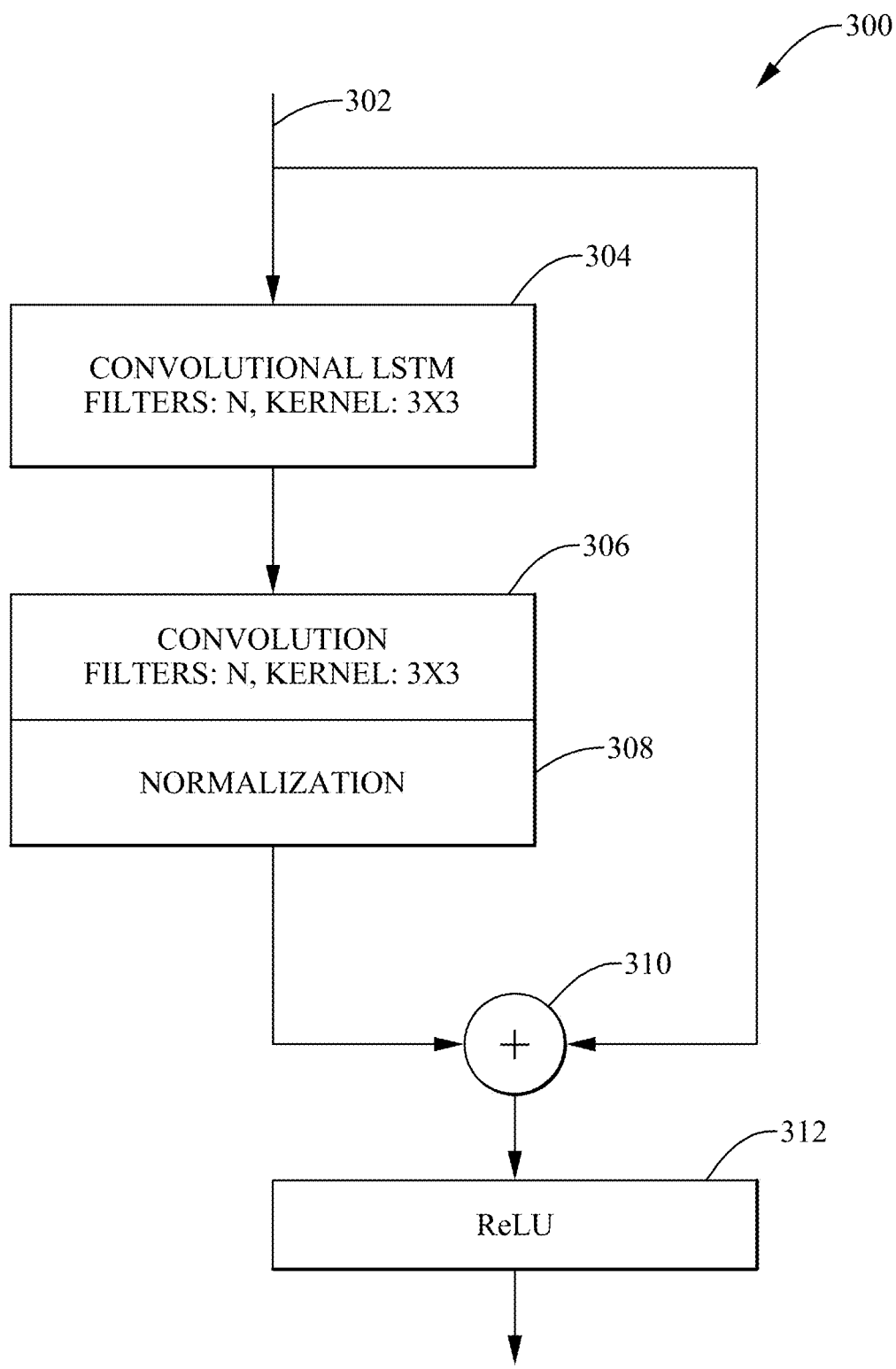
FIG. 3 an illustration of recurrent residual block designs of the recurrent residual backbone 202 as illustrated in FIG. 2.
Figure 4:
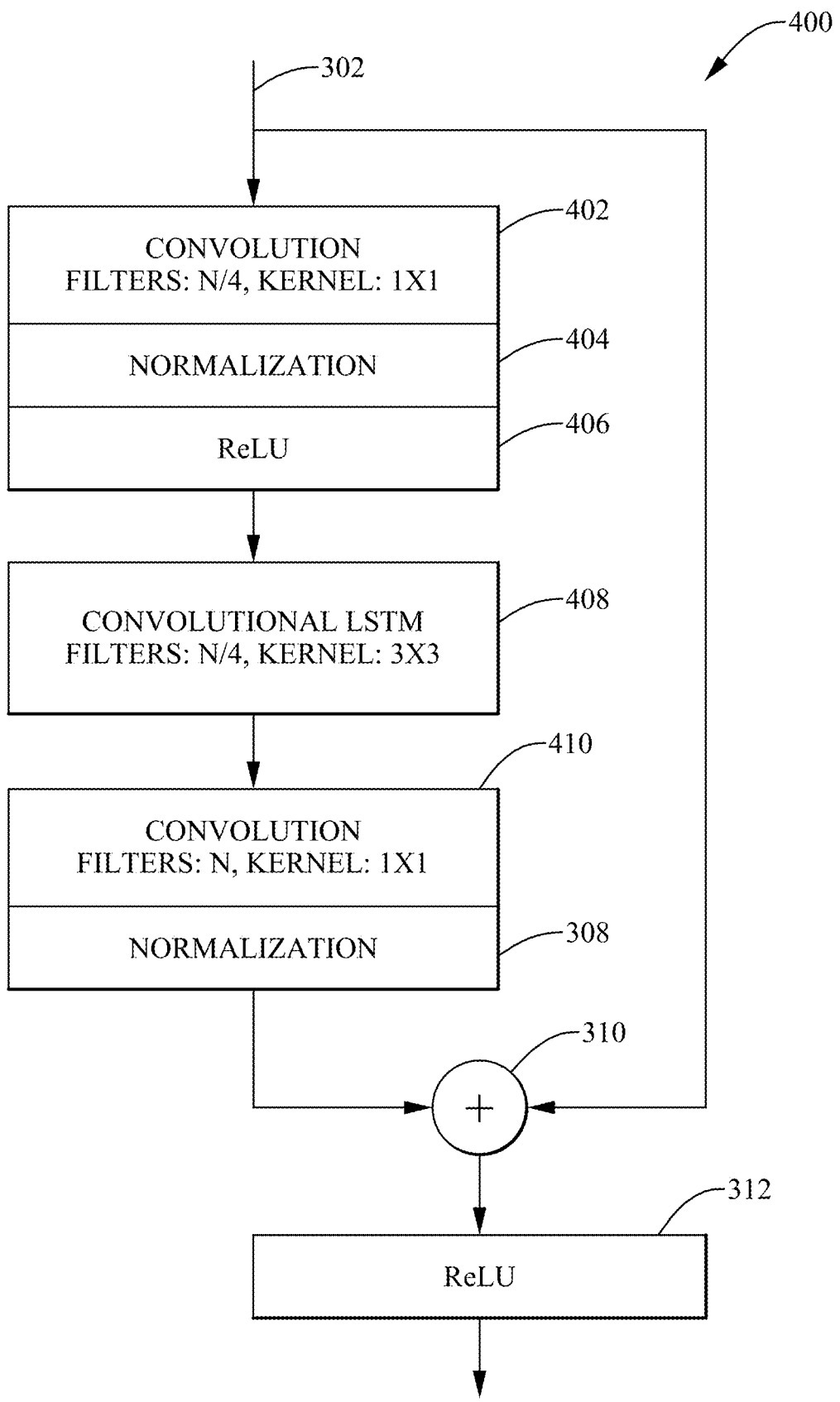
FIG. 4 an illustration 400 of recurrent residual block designs of the recurrent residual backbone 202 as illustrated in FIG. 2.

Regarding the recurrent layers and the backbone, according to various embodiments, the ResNet backbone of RetinaNet may be enhanced by introducing convolutional recurrent layers similar to DeepTracking, either as a separate network block preceding the main part of the backbone (as illustrated in FIG. 1) or by introducing recurrent layers into the residual blocks that comprise it (as illustrated in FIG. 2), creating recurrent residual blocks (for example as illustrated in FIG. 3 or as illustrated in FIG. 4).

FIG. 1 shows an illustration 100 of a network architecture according to various embodiments. A recurrent layer stack 102 is followed by a residual backbone 104 and a feature pyramid 106. The feature pyramid 106 is followed by a regression head 108 and a classification head 110.

FIG. 2 shows an illustration 200 of a network architecture according to various embodiments. A recurrent residual backbone 202 is followed by a feature pyramid 106 (which may be similar or identical to the feature pyramid 106 illustrated in FIG. 1). The feature pyramid 106 is followed by a regression head 108 and a classification head 110 (similar or identical to the network architecture illustrated in FIG. 1).

The network architecture of FIG. 2 improves performance by allowing the network to fuse temporal information on multiple scales (however, possibly at the cost of increased runtime).

According to various embodiments, the network may be trained and operated such that the recurrent loop must only be executed once each frame, while the hidden states are kept between frames. This may provide that the network can learn to use information from arbitrarily distant points in time and that past sensor readings do not need to be buffered and stacked to operate the network.

FIG. 3 shows an illustration 300 of recurrent residual block designs of the recurrent residual backbone 202 as illustrated in FIG. 2. The input data 302 to the recurrent residual block may be a time-sequence of two-dimensional multi-channel feature maps (for example a tensor of shape "Time-steps×Height×Width×Channels", as it may be used for recurrent convolutional networks) depicting a bird's eye view of the scene. Since the backbone is comprised of multiple of these blocks, the specific input of a block may be the output of the previous block or the input to the backbone itself in case of the first block.

According to various embodiments, the input to the backbone itself may be a feature map generated directly from the radar point-cloud by assigning each point detection to the nearest location in the two-dimensional grid. The channels of the feature map may be filled with information such as the number of points assigned to that position and the average Doppler and RCS (radar cross section) values of the assigned points, separately for each radar sensor.

In alternative embodiments, the input to the backbone itself may be raw radar data-cubes, which may be transformed into suitable feature maps via a specialized subnetwork. The use of data-cubes as input and the related subnetwork are detailed as part of European Patent Application 20187674.5, which is incorporated herein in its entirety for all purposes.

The input data 302 may be provided to convolutional LSTM (long short-term memory) 304 (for example with a number N of filters, with a kernel of size 3×3, wherein N may be an integer number) followed by a convolution 306 (for example with a number N of filters, with a kernel of size 3×3), followed by normalization 308. The input data 302 and the output of the normalization 308 may be provided to a processing block 310 (for example to an adder), and the result may be provided to a rectified linear unit (ReLU) 312.

FIG. 4 shows an illustration 400 of recurrent residual block designs of the recurrent residual backbone 202 as illustrated in FIG. 2. The input data 302 may be provided to a convolution 402 (for example with a number N/4 of filters, with a kernel of size 1×1), followed by normalization 404, followed by a rectified linear unit (ReLU) 406, followed by convolutional LSTM 408 (for example with a number N/4 of filters, with a kernel of size 3×3), followed by convolution 410 (for example with a number N of filters, with a kernel of size 1×1), followed by normalization 308. The input data 302 and the output of the normalization 308 may be provided to a processing block 310 (for example to an adder), and the result may be provided to a rectified linear unit (ReLU) 312.

Regarding the feature pyramid and network heads (for example regression head and classification head), the recurrent backbone may be followed by a feature pyramid and network heads for classification and regression, for example similar to RetinaNet. According to various embodiments, the regression head may be modified to perform motion forecasting in the vein of Fast&Furious. Thereby, the tracking capabilities of Fast&Furious may be combined with the benefits of multi-scale detection and scene context from RetinaNet, while temporal information is supplied by the recurrent backbone.

According to various embodiments, forward-prediction is handled by the regression head (rather than by the recurrent loop as in DeepTracking). This way of operating the recurrent layers may produce motion forecasts at each frame easily and efficiently.

According to various embodiments, GRU layers may be replaced with Long-Short Term Memory (LSTM), which may be better at modelling time-dependencies crucial in the radar domain.

According to various embodiments, dilated 3×3 kernels in the recurrent layers may be replaced with regular 5×5 kernels to offset the sparsity of radar data.

According to various embodiments, nearest-neighbour upsampling in the feature pyramid may be replaced with transposed strided convolutions to make the operation learnable, which may increase feature richness. Nearest-neighbour upsampling may increase the spatial resolution, for example by duplicating pixel information by the desired upsampling rate in each direction. In an alternative method, upsampling may be provided by transposed strided convolution, which may distribute information from the lower resolution input map in the higher resolution output map according to a learned convolution filter. This may provide greater freedom in how that information is arranged and combined, and may allow the network to choose upsampling schemes on a per-channel basis that may be more appropriate for the type of the learned feature, which may increase performance.

According to various embodiments, a custom anchor design using bounding box priors at multiple rotations may be used, which may make targets easier to separate and rotation estimation more stable.

According to various embodiments, focal loss may be modified so that it is normalized by the sum of the focal weights (rather than by the number of foreground anchors), which may stabilize training against outlier frames.

According to various embodiments, a training scheme that divides the dataset into mini-sequences of data and retains the hidden states between optimization steps may be provided, which may improve the network's ability to model time-dependencies within the same memory constraints.

Figure 5:
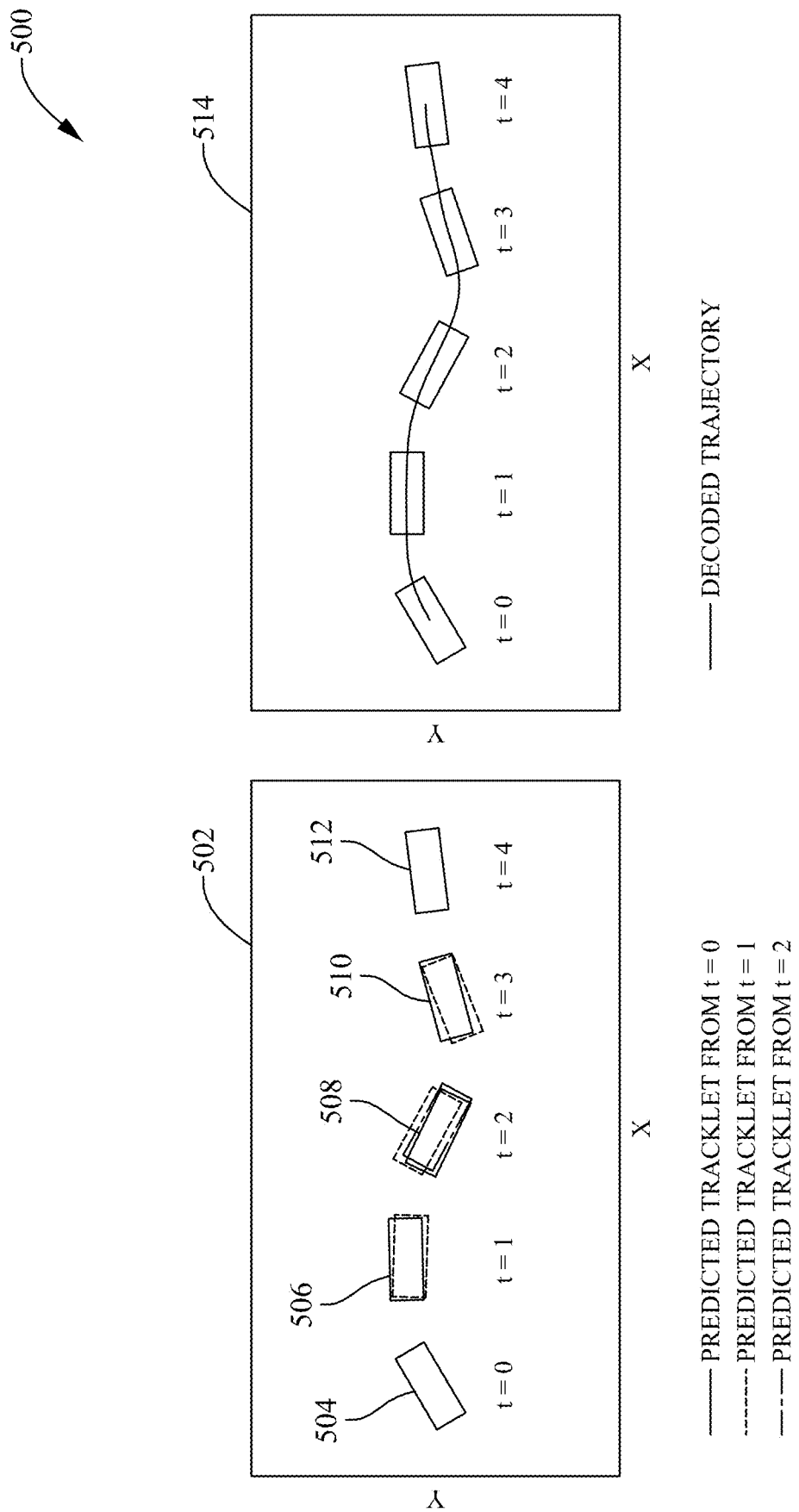
FIG. 5 illustrations of how a trajectory is determined according to various embodiments.

FIG. 5 shows illustrations 500 of how a trajectory is determined according to various embodiments, for example based on a regression head 108 and a classification head 110 as illustrated in FIG. 1 and FIG. 2. As illustrated in the left portion 502 of FIG. 5, predicted tracklets (in other words: predicted tracks for only a limited or low number of time steps, for example for three time steps or for example five time steps) may be determined, and based on a plurality of tracklets (with different starting time step), a trajectory (for more than the low number of time steps) may be determined or decoded as illustrated in the right portion 514 of FIG. 5.

For example, a first tracklet starting from t=0, a second tracklet starting from t=1, and third tracklet starting from t=2 are illustrated in 502. At time step t=0, as illustrated in 504, only information of the first tracklet is available. At time step t=1 (506), information from the first tracklet and the second tracklet is available. At time step t=2 (508), information from the first tracklet, the second tracklet and the third tracklet is available. At time step t=3 (510), information from the first tracklet is no longer available (since the first tracklet is only three time steps long), but information from the second tracklet and the third tracklet is available. At time step t=4 (512), information from the second tracklet is no longer available (since the second tracklet is only three time steps long), but information from the third tracklet is available.

Figure 6:
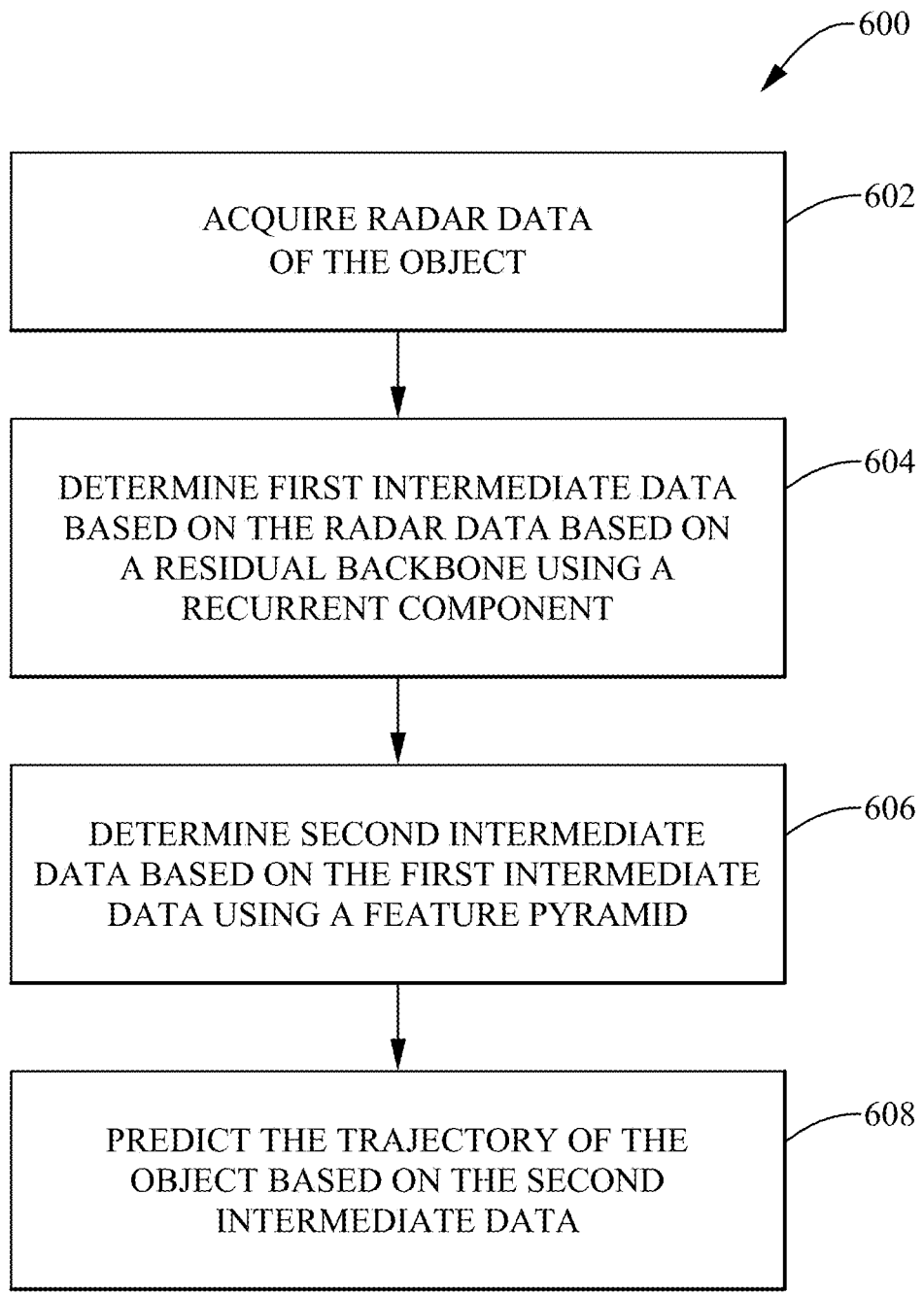
FIG. 6 an illustration of a method for predicting a trajectory of an object according to various embodiments.

FIG. 6 shows an illustration 600 of a method for predicting a trajectory of an object according to various embodiments. At 602, radar data of the object may be acquired. At 604, first intermediate data may be determined based on the radar data based on a residual backbone using a recurrent component. At 606, second intermediate data may be determined based on the first intermediate data using a feature pyramid. At 608, the trajectory of the object may be predicted based on the second intermediate data.

According to various embodiments, the radar data of the object comprises at least one of radar cube data or radar point data.

According to various embodiments, third intermediate data may be determined based on the second intermediate data using a regression head, and the trajectory of the object may be predicted (further) based on the third intermediate data.

According to various embodiments, fourth intermediate data may be determined based on the second intermediate data using a classification head, and the trajectory of the object may be predicted (further) based on the fourth intermediate data.

According to various embodiments, predicting the trajectory may include determining a tracklet for a plurality of time steps.

According to various embodiments, the residual backbone using the recurrent component may include or may be a residual backbone preceded by a recurrent layer stack.

According to various embodiments, the residual backbone using the recurrent component may include or may be a recurrent residual backbone comprising a plurality of recurrent layers.

According to various embodiments, the plurality of recurrent layers may include or may be a convolutional long short-term memory followed by a convolution followed by a normalisation.

According to various embodiments, the plurality of recurrent layers may include or may be a convolution followed by a normalization followed by a rectified linear unit followed by a convolutional long short-term memory followed by a convolution followed by a normalisation.

According to various embodiments, the recurrent component may include or may be a recurrent loop which is carried out once per time frame.

According to various embodiments, the recurrent component may keep hidden states between time frames.

According to various embodiments, the feature pyramid may include transposed strided convolutions.

According to various embodiments, training of the method may include dividing a training data set into a plurality of subsets and/or retaining hidden states between optimization steps.

Each of the steps 602, 604, 606, 608 and the further steps described above may be performed by computer hardware components.

In European Patent Application 20187694.3, which is incorporated herein in its entirety for all purposes, and which may be referred to as Deep Multi-Object Tracker for Radar (DeepTracker for short), improvements upon methods through the use of a deep neural network that performs object detection and short-term (several frames) motion forecasting simultaneously are disclosed. The motion forecasts may be used to perform cross-frame association and aggregation of object information in a simple postprocessing step, allowing for efficient object tracking and temporal smoothing.

DeepTracker may outperform classical tracking approaches significantly, in part because it does not rely on an explicit motion model, but learns appropriate motion models automatically. It outputs forward predictions directly as a fixed-size time-series of bounding boxes, which may imply the following:

1) Forecasting is inherently time-discrete with a limited prediction horizon.
2) The space of possible forecasts may have many more degrees of freedom than any realistic motion model. It is thus possible for the forecasting to represent erratic trajectories, making it prone to overfit to noise and mistakes in the ground truth.
3) Object velocity must either be regressed as a separate output or crudely estimated from the series of discrete positional forecasts.

One way for formulating time-continuous network outputs is given in European Patent Application 19219051.0, which is incorporated herein in its entirety for all purposes, and which may be referred to as Continuous Polynomial Path Prediction, where the network parametrizes polynomial functions describing the two-dimensional position of an object over time. The technique is used there to perform longer-term (for example several seconds long) motion forecasting of individual objects within the object's own coordinate system, based on existing detections.

According to various embodiments, DeepTracker is modified such that, instead of outputting time-series of bounding boxes directly, it provides the coefficients to time-continuous polynomial functions that describe the bounding boxes' temporal evolution in the vein of Continuous Polynomial Path Prediction. This may lead to the following:

1) Forecasts are continuous without any concrete limits on the prediction horizon and can therefore be evaluated at arbitrary points in time.
2) While the network is still not constrained to specific motion models, it is constrained to produce temporally smooth forecasts, precluding unrealistic trajectories.

3) Estimates of an object's velocity can be obtained easily via differentiation of the polynomials that describe position.

Figure 7:
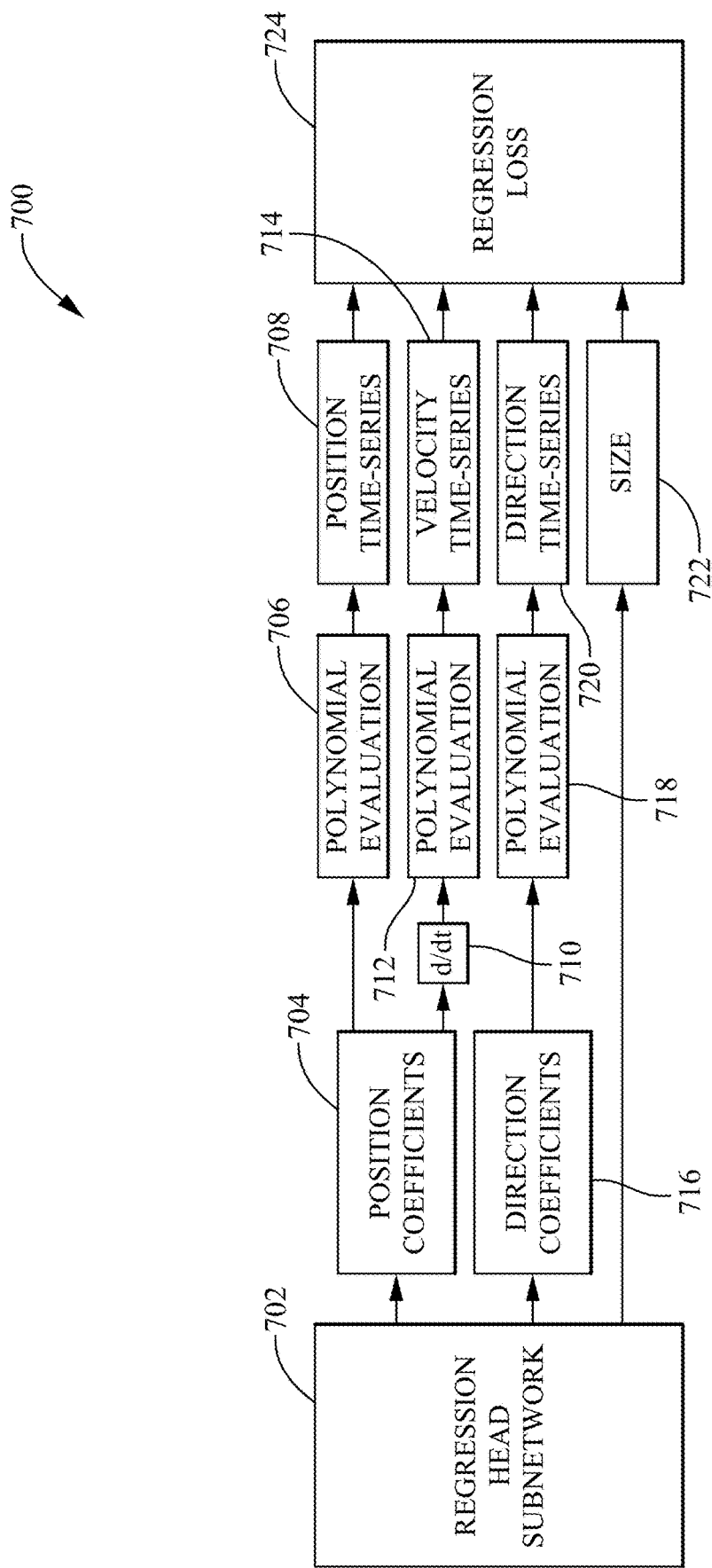
FIG. 7 an illustration of DeepTracker using the polynomial representation in training configuration according to various embodiments.

FIG. 7 shows an illustration 700 of DeepTracker using the polynomial representation in training configuration according to various embodiments. A regression head subnetwork 702 may output position coefficients 704, direction coefficients 716, and size information 722 (wherein size may refer to the two-dimensional extent (length and width) of the objects' bounding boxes; since this is not expected to change over time, it is not represented as a time-series or polynomial unlike position, orientation, and velocity, which do change over time).

The position coefficients 704 may undergo a polynomial evaluation 706 to obtain a position time series 708, which may be an input to the regression loss 724.

The position coefficients 704 may further undergo a differentiation 710 (in order to obtain coefficients for a velocity), and then the differentiated coefficients may undergo a polynomial evaluation 712 to obtain a velocity time series 714, which may also be an input to the regression loss 724.

The direction coefficients 716 may undergo a polynomial evaluation 718 to obtain a direction time series 720, which may be an input to the regression loss 724.

The size information 722 may be a further input to the regression loss 724.

This change of representation may be computationally efficient and does not complicate the network optimization. Since the evaluation of a polynomial function is differentiable, concrete bounding boxes may be calculated at the time points for which ground truth information is available, and standard losses may be used to train the network end-to-end. The bounding boxes may be calculated from the polynomial functions (for example via simple polynomial evaluation). These bounding boxes may then be evaluated against the ground truth bounding boxes, resulting in an error loss term. By propagating the gradients of this error loss through the model, learning is achieved. The process of back-propagation of gradients may require differentiable operators.

Since the parameterized representation (for example using polynomials) may limit the space of possible trajectories, it may have strong regularizing effects on the model. It also further increases statistical efficiency for two reasons.
1) Rather than the number of model parameters scaling with the number of discrete time points in the forecast, it merely scales with the chosen polynomial degree. For example for a system running at 20 Hz, the polynomial degree required to accurately represent a certain time-series may be much lower than the number of frames in that time-series.
2) Both positional and velocity ground truth information may provide gradient signals for the same underlying function.

A number of techniques specialized for the optimization of polynomial functions, especially in the context of a joint detection and tracking network, were developed or adapted from Continuous Polynomial Path Prediction to further improve performance. These techniques will be described in the following.

These techniques may increase the performance of polynomial-based motion forecasting and velocity estimation in neural networks. Thus, these techniques may be applied to any neural network tracking systems that incorporates polynomial-based motion forecasting and velocity estimation.

To ensure favorable behavior of the polynomial functions within the relevant time span, the prediction horizon of the ground truth during training may be chosen to extend beyond the points that are later used constructively for tracking. According to various embodiments, the horizon may be expanded both ways, meaning the polynomial model may be trained to predict into the past relative to the current frame to ensure the polynomial is well behaved around its prediction for the present.

Since velocity is determined as the derivative of position, the same spatial units may be used. Therefore, the temporal units of the polynomials may be carefully chosen such that position and velocity have a similar absolute scale, allowing for joint whitening of the target distributions, which is vital for neural network optimization. The choice of the temporal units may depend on the overall standard deviation of position and velocity and are thus dataset-dependent. For example, the temporal units may be about $\frac{1}{10}$ seconds (or 2 frames). The scale of position and velocity may be determined empirically and the temporal units may be adjusted to make them equal, so that their distributions may then both be whitened without disturbing their relationship.]

According to various embodiments, for each ground truth forecast during training, a random subset of all available prediction points within the prediction horizon for purposes of regularization may be chosen.

The continuous network output according to various embodiments may be applied to the synchronization/fusion between multiple sensors. Sensors may fire at slightly different points in time, meaning that scans of the environment obtained from these sensors for the same "frame" in truth have a small temporal offset to one another. The assumption made by many systems that all frame data is synchronous therefore can introduce small but potentially disruptive errors. With time-continuous network output (when produced, for example, separately for each sensor), object information may be projected into arbitrary points in time, allowing a more accurate synchronization no matter the nature of the sensors' temporal misalignment.

Figure 8:
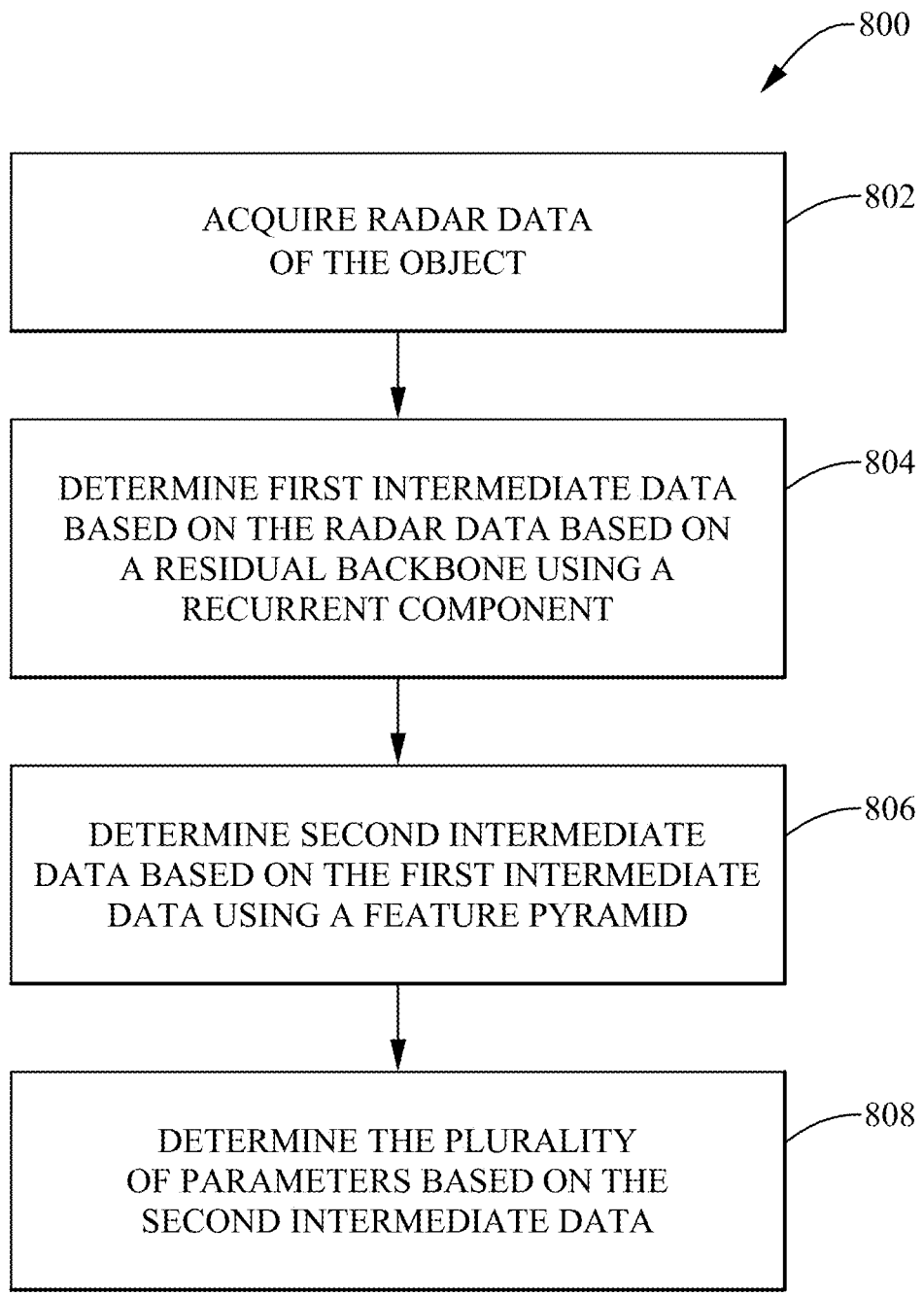
FIG. 8 a flow diagram illustrating a method for determining a plurality of parameters of a parametrization of a predicted trajectory of an object according to various embodiments.

FIG. 8 shows a flow diagram 800 illustrating a method for determining a plurality of parameters of a parametrization of a predicted trajectory of an object according to various embodiments. At 802, radar data of the object may be acquired. At 804, first intermediate data may be determined based on the radar data based on a residual backbone using a recurrent component. At 806, second intermediate data may be determined based on the first intermediate data using a feature pyramid. At 808, the plurality of parameters may be determined based on the second intermediate data.

According to various embodiments, the parametrization may include or may be a polynomial of a pre-determined degree; and the parameters may include or may be a plurality of coefficients related to elements of a basis of the polynomial space of polynomials of the pre-determined degree.

According to various embodiments, the elements of the basis may include or may be monomials.

According to various embodiments, the parametrization may include or may be a first parametrization, parameterizing a position trajectory of the object, and a second parametrization, parameterizing an orientation of the object.

According to various embodiments, the radar data of the object may include or may be at least one of radar data cubes or radar point data.

According to various embodiments, the method may further include: determining third intermediate data based on the second intermediate data using a regression head; and determining the parameters based on the third intermediate data.

According to various embodiments, the residual backbone using the recurrent component may include or may be a residual backbone preceded by a recurrent layer stack; and/or the residual backbone using the recurrent component may include or may be a recurrent residual backbone comprising a plurality of recurrent layers.

According to various embodiments, the plurality of recurrent layers may include or may be a convolutional long short-term memory followed by a convolution followed by a normalization: and/or the plurality of recurrent layers may include or may be a convolution followed by a normalization followed by a rectified linear unit followed by a convolutional long short-term memory followed by a convolution followed by a normalization.

According to various embodiments, the recurrent component may include or may be a recurrent loop which is carried out once per time frame.

According to various embodiments, the recurrent component may keep hidden states between time frames.

According to various embodiments, the feature pyramid may include or may be transposed strided convolutions.

According to various embodiments, training of the method may include dividing a training data set into a plurality of subsets and/or retaining hidden states between optimization steps.

Each of the steps 802, 804, 806, 808 and the further steps described above may be performed by computer hardware components.

What is claimed is:

1. A method comprising:
   acquiring, by computer hardware components, a plurality of frames of radar data of an object;
   via a convolutional neural network, performing temporal fusion of features of the plurality of frames of radar data, wherein the convolutional neural network comprises a residual backbone, a feature pyramid and a regression head;
   determining, using a recurrent component, first intermediate data based on the plurality of frames of radar data and the residual backbone;
   determining, using the feature pyramid, second intermediate data based on the first intermediate data, wherein the second intermediate data comprises a plurality of features;
   determining via the regression head a plurality of coefficients to time-continuous polynomial functions based on the plurality of features; and
   predicting, based on the plurality of coefficients, a trajectory of the object.

2. The method of claim 1, wherein predicting the trajectory of the object comprises determining a plurality of parameters, based on the second intermediate data, of the predicted trajectory of the object.

3. The method of claim 2, wherein determining the plurality of parameters comprises:
   determining polynomials of a pre-determined degree; and
   determining the plurality of coefficients related to elements of a basis of a polynomial space of the polynomials of the pre-determined degree, the elements of the basis comprising monomials,
   determining a first parameter, based on a position trajectory of the object, and a second parameter, based on an orientation of the object, and
   wherein a velocity estimation, via differentiation, is provided.

4. The method of claim 1, wherein the plurality of frames of radar data of the object comprise at least one of radar data cubes or radar point data.

5. The method of claim 1, further comprising:
   determining, using a classification head, fourth intermediate data based on the second intermediate data; and
   predicting, based on the fourth intermediate data, the trajectory of the object.

6. The method of claim 1, wherein the convolutional neural network comprises at least one of:
   the residual backbone preceded by a recurrent layer stack; or
   the residual backbone implemented as a recurrent residual backbone comprising a plurality of recurrent layers.

7. The method of claim 6, wherein:
   the convolutional neural network comprises the residual backbone implemented as the recurrent residual backbone and comprising the plurality of recurrent layers; and
   the plurality of recurrent layers comprise a convolutional long short-term memory followed by convolution filters followed by a normalization processor.

8. The method of claim 6, wherein:
   the convolutional neural network comprises the residual backbone implemented as the recurrent residual backbone and comprising the plurality of recurrent layers; and
   the plurality of recurrent layers comprise a convolution processor followed by a normalization processor followed by a rectified linear unit followed by a convolutional long short-term memory followed by another convolution processor followed by another normalization processor.

9. The method of claim 1, wherein predicting the trajectory of the object comprises determining a tracklet for a plurality of time steps.

10. The method of claim 1, wherein the recurrent component comprises a recurrent loop that is carried out once per time frame.

11. The method of claim 1, wherein the recurrent component keeps hidden states between time frames.

12. The method of claim 1, wherein the feature pyramid implements transposed strided convolutions.

13. The method of claim 1, further comprising:
    dividing a training data set into a plurality of subsets or retaining hidden states between optimization steps; and
    training, based on the plurality of subsets divided from the training data or the hidden states retained between optimization steps, the computer hardware components to perform the method to predict the trajectory of the object.

14. The method of claim 1, further comprising, via the regression head, providing the plurality of coefficients to the time-continuous polynomial functions that describe temporal evolution of bounding boxes in context of continuous polynomial path prediction.

15. The method of claim 1, further comprising at least one of training or operating the convolutional neural network such that a recurrent loop is executed once each frame, while hidden states are kept between frames such that the convolutional neural network uses information from arbitrarily distant points in time and past sensor readings are not buffered and stacked to operate the convolutional neural network.

16. The method of claim 1, further comprising determining the first intermediate data based on a time-sequence of two-dimensional multi-channel feature maps depicting a bird's eye view of an environment.

17. The method of claim 1, further comprising:
evaluating the plurality of coefficients via a first polynomial function to provide a velocity time series;
evaluating the plurality of coefficients via a second polynomial function to provide a direction time series;
receiving size information from the regression head; and
providing the velocity time series, the direction time series and the size information to a regression loss processor.

18. A system, the system comprising a plurality of computer hardware components configured to:
acquire a plurality of frames of radar data of an object;
via a convolutional neural network of the plurality of computer hardware components, perform temporal fusion of features of the plurality of frames of radar data, wherein the convolutional neural network comprises a residual backbone, a feature pyramid and a regression head;
determine, using a recurrent component, first intermediate data based on the plurality of frames of radar data based on the residual backbone;
determine, using the feature pyramid, second intermediate data based on the first intermediate data, wherein the second intermediate data comprises a plurality of features;
determine via the regression head a plurality of coefficients to time-continuous polynomial functions based on the plurality of features; and
predict, based on the plurality of coefficients, a trajectory of the object.

19. The system of claim 18, wherein the plurality of computer hardware components are further configured to predict the trajectory of the object by determining a plurality of parameters of the predicted trajectory of the object based on the second intermediate data.

20. The system of claim 19, wherein the plurality of computer hardware components are further configured to determine the plurality of parameters by:
determining polynomials of a pre-determined degree; and
determining the plurality of coefficients related to elements of a basis of a polynomial space of the polynomials of the pre-determined degree, the elements of the basis comprising monomials.

21. The system of claim 20, further comprising:
determining a first parameter, based on a position trajectory of the object, and a second parameter, based on an orientation of the object; and
providing a velocity estimation via differentiation.

22. The system of claim 18, wherein the system is implemented on a vehicle.

23. A non-transitory computer readable medium comprising instructions, that when executed, configure at least one processor to:
acquire a plurality of frames of radar data of an object;
via a convolutional neural network, perform temporal fusion of features of the plurality of frames of radar data, wherein the convolutional neural network comprises a residual backbone, a feature pyramid and a regression head;
determine, using a recurrent component, first intermediate data based on the plurality of frames of radar data based on the residual backbone;
determine, using the feature pyramid, second intermediate data based on the first intermediate data, wherein the second intermediate data comprises a plurality of features;
determine via the regression head a plurality of coefficients to time-continuous polynomial functions based on the plurality of features; and
predict, based on the plurality of coefficients, a trajectory of the object.

* * * * *